Aug. 10, 1954   H. W. KLAS   2,686,025
PARACHUTE RELEASING MEANS
Filed Sept. 24, 1946   2 Sheets-Sheet 1

Inventor
H. W. Klas
M. O. Hayes
Attorney

Aug. 10, 1954  H. W. KLAS  2,686,025
PARACHUTE RELEASING MEANS
Filed Sept. 24, 1946  2 Sheets-Sheet 2

Inventor
H. W. Klas
M. A. Hayes
By
Attorney

Patented Aug. 10, 1954

2,686,025

UNITED STATES PATENT OFFICE 2,686,025

PARACHUTE RELEASING MEANS

Harold W. Klas, Sylvania, Ohio

Application September 24, 1946, Serial No. 699,067

7 Claims. (Cl. 244—138)

(Granted under Title 35, U. S. Code (1952), sec. 266)

This invention relates generally to means for releasing a parachute from a load carried thereby such, for example, as mines, torpedoes, rescue equipment and the like, and more particularly to parachute release means which operate in response to the impact of the load with the surface of the target area.

Various devices heretofore employed for releasing a parachute from its load upon impact with the target area have normally comprised an inertia responsive element for shearing or removing a pin adapted to couple the parachute to the load. Such devices have not been found to be entirely satisfactory under all conditions of service for the reason that the force of inertia acting on the inertia element may be insufficient to shear the coupling pin when the load strikes the surface of the target area at an oblique angle therewith or when the load enters a body of water at a relatively low velocity.

The foregoing difficulties of the prior art devices, when employed for use with marine mines and like devices, have been obviated by the parachute release mechanism for a marine mine disclosed and claimed in my copending application for Parachute Release Means, Serial No. 603,100, filed July 3, 1945 wherein an electroresponsive detonator is energized by a sea battery as the mine enters the water and the coupling pin is forcibly ejected to disconnect the parachute from the mine by the force of the explosion as the detonator is fired.

According to the arrangement of the present invention, the detonator of the release mechanism of the aforementioned application is energized by a circuit under control of an inertia switch responsive to relatively weak inertia forces whereby the parachute release mechanism may be caused invariably to release the parachute from its load regardless of whether the load strikes upon land or sea and substantially independently of the angle of impact with the surface thereof. As the mine strikes the surface of a body of water or of the earth, whichever the case may be, the impact causes a metallic ball confined within a cylindrical tube to be moved forcibly past a yieldable detent into circuit closing relation with a pair of switch elements forming a part of the aforesaid circuit and disposed in the bottom of the tube, the detent normally serving to prevent such movement of the ball.

Means releasable upon launching the load from an aircraft is also provided to prevent movement of the ball into actuating engagement with the detent in response to shocks received by the release mechanism during handling or transportation thereof.

One of the objects of the present invention is the provision of new and improved means for releasing a parachute from its load wherein the release is effected by firing an explosive charge when the load strikes the surface of the target area.

Another object is to provide a new and improved parachute releasing mechanism adapted to operate on relatively weak inertia forces resulting from impact of the parachute load with the surface of the target area.

Another object resides in the provision of a parachute releasing mechanism in which the parachute is released from its load by the explosion of a charge and in which the charge is fired under control of an inertia switch responsive to the impact of the load with the surface of the target area substantially independently of the velocity of the load and the angle at which it strikes the surface.

A further object is to provide an inertia responsive parachute release mechanism having means for preventing actuation of the mechanism in response to shocks received thereby during handling and transportation.

Still other objects, features and advantages of the present invention are those implied from or inherent in the novel construction, combination and arrangement of parts as will become more fully apparent from the following detailed description of a preferred embodiment of the invention, reference being had to the accompanying drawings in which.

Figure 1:
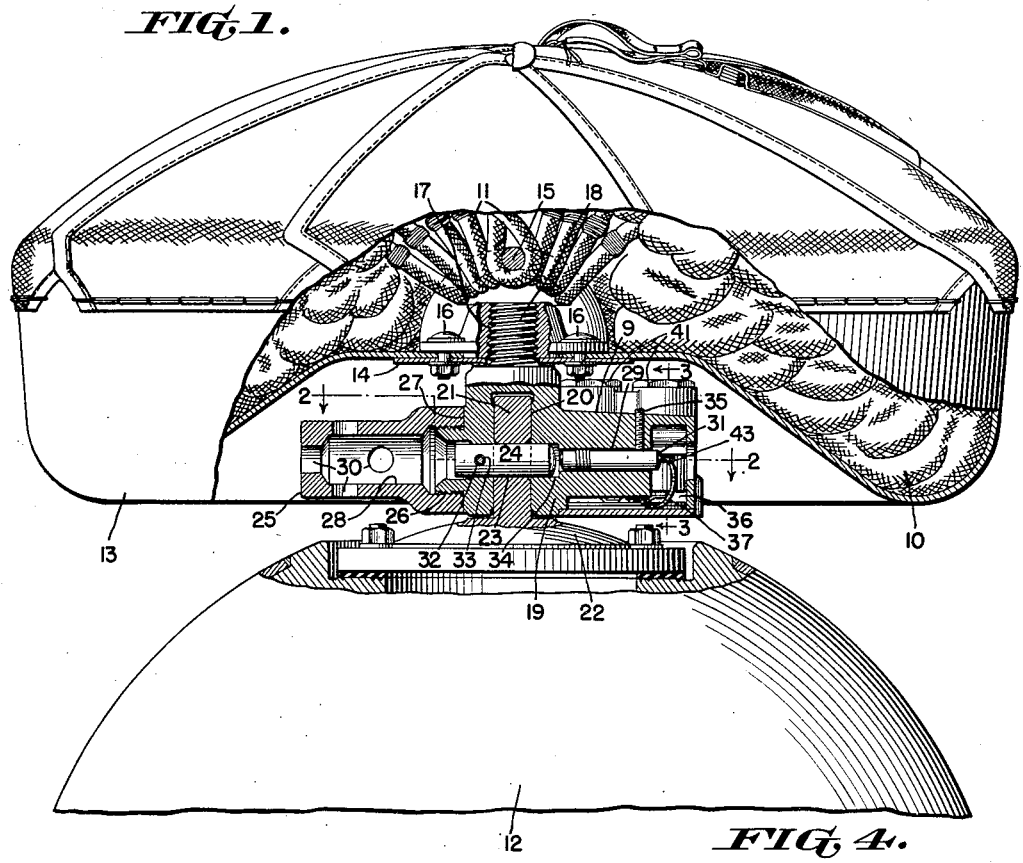
Fig. 1 is a view in elevation, partly in section and partly broken away, of a mine and a parachute pack suitable for use with the parachute release mechanism of the present invention.

Referring now to the drawings in which like numerals of reference are employed to designate like parts throughout the several views and more particularly to Fig. 1, there is shown thereon a parachute indicated generally by the numeral 10, having a plurality of shroud lines 11 for establishing a connection between the parachute and the parachute releasing mechanism attached to the mine 12. The parachute 10 is provided with a parachute pack including a dish-shaped member 13 within which the parachute is folded prior to the release of the mine from an aircraft in flight, the parachute being adapted to be withdrawn from the member in any well known manner as, for example, by a static line as the mine falls away from the aircraft.

Member 13 is supported by a washer 14 and a shroud keeper 15 which are secured together in any suitable manner as by the bolts 16 so as to clamp member 13 therebetween. Shroud keeper 15 has an internally threaded portion 17 adapted to receive the externally threaded projection 18 of the latch body 19. The latch body 19 is provided with a transverse slot 20 adapted to receive the upstanding portion 21 of the support 22 attached to the mine 12.

Latch body 19 has a transverse cylindrical portion 9 having therein a central bore 34 containing a pin 24 which also passes through a bore 23 in upstanding portion 21 when the latch body is in assembled position on support 22. Pin 24 is slideably arranged in the transverse cylindrical portion 9 and is locked to the latch body 19 by shear pin 32 when the pin 24 is in the assembled position, a suitable transverse bore 33 being provided within the pin for this purpose.

An enlarged exhaust chamber 25 is threadedly attached to the latch body 19 as at 26. The latch body preferably has a shoulder 27 adapted to engage a complementary surface on the exhaust chamber whereby these parts may be drawn together tightly into registered engagement. The exhaust chamber 25 is preferably provided with a plurality of apertures 30 in communication with the exhaust bore 28 therein to provide an escape for the gases formed by the firing of the electroresponsive detonator 31 which is received into a reduction of bore 34 in transverse portion 9.

Figure 2:
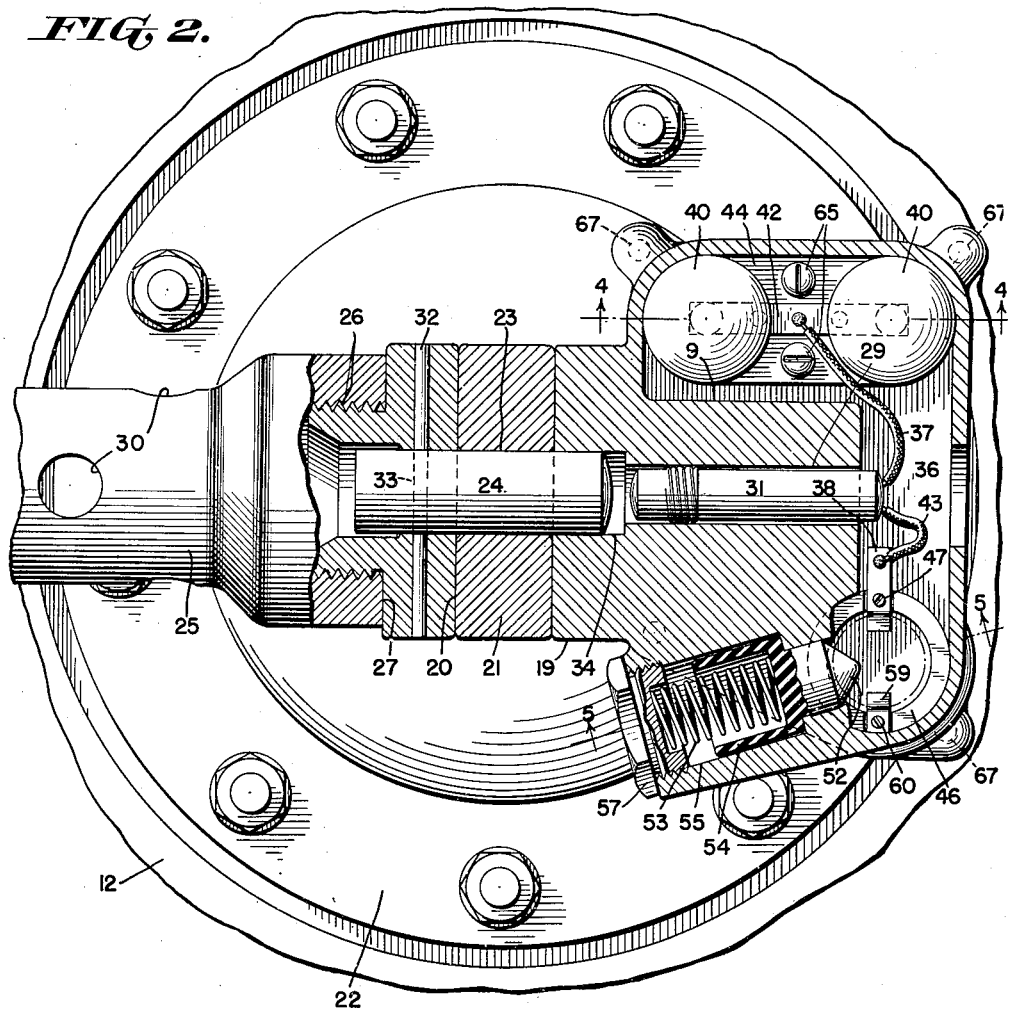
Fig. 2 is an enlarged plan view partly in section and partly broken away of the release mechanism taken along the line 2—2 of Fig. 1 and showing the various elements of the release mechanism prior to actuation thereof.
Figure 5:
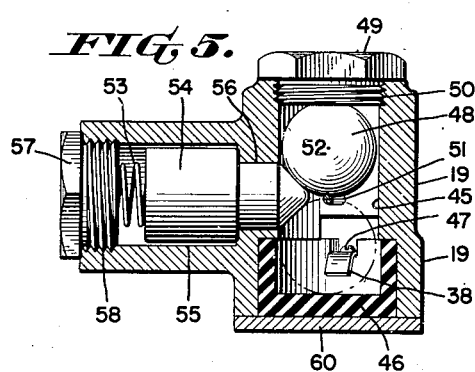
Fig. 5 is a sectional view taken along the line 5—5 of Fig. 2 and showing details of the switch actuating mechanism.

Pin 24 is releasably locked in an initial position by the shear pin 32 arranged within opening 33 more clearly shown in Fig. 2, and is adapted to pass freely through the pin 24 and to be force-fitted within a suitable opening therefor in cylindrical portion 9.

Figure 3:
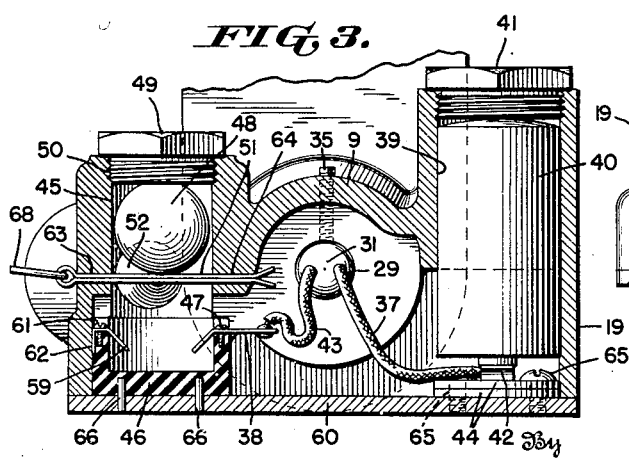
Fig. 3 is an enlarged sectional view taken along the line 3—3 of Fig. 1 and showing the means for holding the switch ball in a safe locked position prior to launching of the mine.

As shown in Figs. 1 and 3, detonator 31 is secured within the detonator bore 29 by the set screw 35. Detonator bore 29 is in communication with a well 36 within the latch body 19 which provides a passageway for detonator leads 37 and 43, the latter lead being connected to an electrical terminal 38 extending within the passageway. Well 36 is in communication with the battery cavities 39 within which batteries 40 are confined as by threaded plugs 41, these plugs serving, upon adjustment thereof, to urge the batteries into electrical contact with the terminal strip 42 and to ground one end of each of the batteries.

Figure 4:
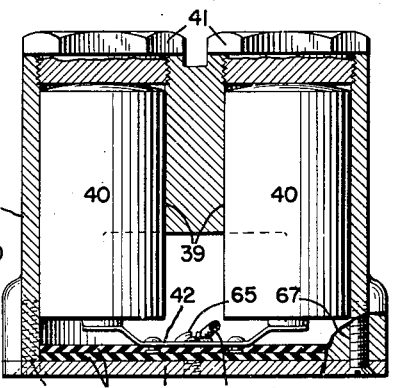
Fig. 4 is a sectional view taken along the line 4—4 of Fig. 2 and showing one method of mounting the batteries and providing the electrical connections therebetween.

As may best be seen in Figs. 3 and 4, electrical terminal strip 42 is in electrical connection with detonator 31 by way of lead 37 thereof whereby the detonator is adapted to be fired by current from the parallel-connected batteries 40 when terminal 38 is connected to ground, as hereinafter more fully described.

Electrical terminal 42 is riveted, or otherwise secured, to insulation pieces 44 which are fitted inot the merged opening of battery cavities 39, pieces 44 being secured to a base plate 60 as by screws 65.

Electrical terminal 38 projects into a vertical bore 45 in latch body 19 and is secured, as by a screw 47, to the lip of a cup-shaped insulation member 46 which is received into an enlargement of bore 45 and retained therein by plate 60 to which it may be secured as by pins 66. Plate 60 encloses well 36, battery cavities 39 and bore 45 and is secured to latch body 19 as by screws 67.

A terminal 59 is similarly secured to member 46, as by a screw 61, and is disposed diametrically opposite to terminal 38 thereon. Terminal 59, however, has a depending end portion 62 which engages latch body 19 to form a ground connection therewith. The other end of terminal 59, and the corresponding end of terminal 38, project diagonally within member 46 so as to be engageable yieldably by a metallic ball 48 carried slideably within bore 45 and retained therein by a plug 49 in threaded engagement with latch body 19 as at 50.

Ball 48 normally is yieldably maintained out of engagement with terminals 38 and 59, after arming pin 51 has been withdrawn, by means of a spring-loaded detent generally designated 54 and slideably received within a transverse opening 55 in communication with bore 45. Detent 54 has a conical-shaped reduced end portion 52 which is urged through reduction 56 of opening 55 into the path of the ball by a coil spring 53 which is interposed under compression between the detent and a plug 57 in threaded engagement with the latch body as at 58, sockets preferably being provided in the enlarged end portion of the detent and in plug 57 to serve as seats for the ends of spring 53. The shoulder between the enlarged and reduced end portions of the detent engages the shoulder formed between the opening 55 and the reduction 56 thereof, thus limiting movement of the detent into bore 45. The detent preferably is formed of insulation material, as shown.

Arming pin 51 is secured in transverse bores 63 and 64 in the latch body and is connected to an arming wire 68 for withdrawing the pin therefrom.

The operation of the device will now be described. Let it be assumed that the mine is to be released from an aircraft in flight.

The arming wire 68 is attached to the aircraft structure so that arming pin 51 is withdrawn from the latch body 19 as the mine is released from the aircraft.

Switch ball 48 is held in the upper portion of bore 45 during descent of the mine 12 through the air by detent 54.

As the mine 12 strikes a body of water or the earth, as the case may be, the impact causes switch ball 48 to depress detent 54 against the opposing force of spring 53 sufficiently to permit the ball to move past the detent and connect electrical terminals 38 and 59. When this occurs, the circuit from batteries 40 to detonator 31 is completed and the detonator is fired. The force of the explosion of the detonator is directed against coupling pin 24 and forcibly ejects the pin from the latch body 19 and upstanding portion 21 of support 22 into the exhaust chamber 28, thereby disconnecting the parachute and pack from the mine, safety pin 32 being sheared during such movement of the coupling pin. Shear pin 32 has sufficient strength to prevent the outward movement of the pin 24 in response to handling and launching forces but yields in response to the explosion of the detonator 31.

Briefly stated in summary, the invention in its broader aspects contemplates the provision of a parachute release mechanism for a load adapted to be launched from an aircraft in flight in which the release of the parachute from the load is effected by firing a small explosive charge in response to the impact of the mine with the surface of a target area and in which the impact actuates a switch to complete a firing circuit for the charge, means also being employed for preventing the premature operation of the parachute releasing mechanism as a result of a shock or blow received during the handling, transportation or flight.

While the invention has been described with reference to a particular example thereof which gives satisfactory results, it will be understood by those skilled in the art, after understanding the invention, that various changes and modifications may be made without departing from the spirit and scope of the invention and it is intended, therefore, in the appended claims to cover all such changes and modifications.

This invention may be manufactured and used by or for the Government of the United States of America for governmental purposes without payment of any royalties thereon or therefor.

What is claimed as new and desired to be secured by Letters Patent of the United States is:

1. In a parachute release mechanism of the character disclosed for releasing an object from a parachute therefor as the object strikes the surface of a target area, the combination of a supporting member secured to the parachuted object, a pin slideably arranged within said support and adapted to be moved from an initial locking position to a released position, a complementary member secured to said parachute and adapted to be locked to said supporting member by said pin when the pin is in said initial locking position, means for yieldably securing said pin in said initial position to prevent the movement of the pin to said released position in response to a shock received by the release mechanism prior to the launching of said object, an electroresponsive explosive charge arranged within the complementary member in substantial abutting relation with one end of the pin and adapted to eject the pin from said locking position as the charge is fired, and circuit means including a source of electric energy and a normally open inertia switch for firing said charge as the inertia switch is closed in response to the impact of the parachuted object with the surface of the target area.

2. In a release mechanism of the character disclosed for releasing a parachute from a load as the load strikes the surface of a target area, the combination of a pair of complementary members, the members being secured to the parachute and to the load respectively, means including a rod slideably arranged within said members for releasably locking the members together, an electroresponsive detonator arranged in proximate spaced relation with respect to one end of said rod and adapted to eject the rod forcibly from locking engagement with said members as the detonator is fired, and a firing circuit including at least one battery and a normally open inertia switch arranged within one of the members and adapted to complete the circuit between the battery and the detonator as the inertia switch closes in response to the impact of the load with the surface of the target area.

3. In a parachute release mechanism for an aircraft planted mine and adapted to release the parachute from the mine as the mine strikes the surface of a target area, the combination of a dish-shaped member within which the parachute is adapted to be packed, a fixture attached to the dish-shaped member adapted to engage the shroud lines of the parachute, a latch body secured to the dish-shaped member and having a plurality of bores therein, a fixed support secured to the mine, means including a slideable rod arranged within one of said plurality of bores in the latch body and adapted to be received slideably by the fixed support thereby to provide a releasable locking engagement between the fixed support and the latch body, electroresponsive explosive means disposed within another one of the bores in the latch body and adapted to eject said rod from said locking engagement with the support as the explosive means is fired, a plurality of batteries arranged within the remaining bores in the latch body, and means including a normally open inertia switch for causing said batteries to fire the explosive means as the switch is closed in response to the impact of the mine with the target area.

4. In a mechanism of the character disclosed for releasing an aircraft planted mine from the parachute therefor as the mine strikes the surface of a target area, in combination, a fixed member secured to the mine, a complementary member secured to the parachute, a rod slideably arranged within said complementary and fixed members and adapted to be moved from an initial position providing a locking engagement therebetween to a moved position for releasing said locking engagement, a pin in shearable locking engagement with said rod to prevent movement thereof from said initial position in response to a shock received by the mine prior to planting thereof, an electroresponsive detonator within said complementary member in substantial abutting relation with one end of the rod and adapted to forcibly move the rod to said moved position thereof as the detonator is fired, means forming an exhaust chamber in axial alignment with said rod and adapted to receive the rod upon movement thereof to said moved position, a circuit including a plurality of batteries arranged within the complementary member for firing the detonator when the circuit is completed thereto, and a normally open inertia switch for completing said circuit between the batteries and detonator as the switch is closed and including an electrically conducting ball adapted to be moved to close the switch in response to the impact of the mine with the surface of the target area.

5. In a mechanism of the character disclosed for releasing a parachute from a mine when it strikes the surface of a target area, the combination of a latch body secured to the parachute, a complementary member secured to the mine, a latch moveably arranged within the latch body and initially in locking engagement with the complementary member, an electroresponsive detonator within the latch body for forcibly ejecting the latch from said locking engagement as the detonator is fired, a source of electric energy within the latch body, and means for causing the source of energy to fire the detonator in response to the impact of the mine with the target area.

6. In a mechanism of the character disclosed for releasing a mine from a parachute upon impact of the mine with the surface of the target area, the combination of a latching member secured to the parachute, a complementary member secured to the mine, means for yieldably maintaining the latching member in locking engagement with the complementary member, an electroresponsive detonator associated with the latching member and adapted to force the latching member out of locking engagement with the complementary member as the detonator is fired, a normally open circuit for firing the detonator, said circuit including a pair of spaced terminals, an electrically conducting inertia element adapted to bridge said terminals and thereby close the circuit, and a spring-biased detent interposed between the terminals and the inertia element for preventing movement of the element into bridging engagement with the terminals until the element is moved forcibly past the detent in response to the impact of the mine with the target.

7. A device of the character disclosed for releasing a parachute from a load as the load strikes the surface of a target area comprising, a pair of complementary members secured to the parachute and to the load respectively, a movable pin for releasably locking said members together, an electroresponsive explosive means for forcibly moving said pin from locking engagement with said members when the explosive means is fired, a cylindrical member vertically arranged within one of said complementary members, a movable inertia mass initially arranged within the upper portion of said cylindrical member, a firing circuit for said explosive means including a source of power and a pair of terminals arranged in mutually spaced relation at the lower portion of said cylindrical member and adapted to detonate said explosive means when the terminals are bridged by said mass as the mass moves to a lower portion of said cylindrical member, and a spring urged detent arranged between said inertia mass and said terminals for preventing movement of the mass from the upper portion of said cylindrical member until the mass is forcibly moved past the detent in response to the impact of the load with the surface of the target area.

References Cited in the file of this patent

UNITED STATES PATENTS

| Number | Name | Date |
|---|---|---|
| 1,709,264 | Holt | Apr. 16, 1929 |
| 2,118,603 | Hailey | May 24, 1938 |
| 2,415,086 | Detwiler | Feb. 4, 1947 |
| 2,420,746 | Heidman | May 20, 1947 |
| 2,458,478 | Maneval | Jan. 4, 1949 |

FOREIGN PATENTS

| Number | Country | Date |
|---|---|---|
| 305,015 | Germany | Nov. 1, 1921 |